US008246078B2

(12) United States Patent
Yun

(10) Patent No.: US 8,246,078 B2
(45) Date of Patent: Aug. 21, 2012

(54) SAFETY APPARATUS FOR MOTORCYCLE

(75) Inventor: Hiyun Yun, Ulsan (KR)

(73) Assignee: Ji Young Yun, Ulsan (KR)

( * ) Notice: Subject to any disclaimer, the term of this patent is extended or adjusted under 35 U.S.C. 154(b) by 0 days.

(21) Appl. No.: 13/369,312

(22) Filed: Feb. 9, 2012

(65) Prior Publication Data

US 2012/0139220 A1 Jun. 7, 2012

Related U.S. Application Data

(63) Continuation of application No. 13/389,045, filed as application No. PCT/KR2010/004264 on Jul. 1, 2010.

(30) Foreign Application Priority Data

Aug. 14, 2009 (KR) .................. 10-2009-0075110

(51) Int. Cl.
 *B60R 21/00* (2006.01)
(52) U.S. Cl. ...................................... 280/755
(58) Field of Classification Search ............... 280/288.4, 280/293, 298, 301, 755, 763.1, 765.1, 766.1
 See application file for complete search history.

(56) References Cited

U.S. PATENT DOCUMENTS

| 2,960,351 | A | * | 11/1960 | Jeffress | 280/293 |
| 3,397,898 | A | * | 8/1968 | Denney et al. | 280/755 |
| 3,951,281 | A | * | 4/1976 | Parquet | 414/697 |
| 4,133,402 | A | * | 1/1979 | Soo Hoo | 180/209 |
| 5,029,894 | A | * | 7/1991 | Willman | 280/755 |
| 6,213,237 | B1 | * | 4/2001 | Willman | 180/209 |
| 7,396,033 | B2 | * | 7/2008 | Murata et al. | 280/293 |

FOREIGN PATENT DOCUMENTS

| JP | 04-041479 U | 4/1992 |
| JP | 2001-253376 A | 9/2001 |
| JP | 2004-306752 A | 11/2004 |
| KR | 20-1997-0004704 Y1 | 5/1997 |
| KR | 20-0183313 Y1 | 5/2000 |
| KR | 2003-31980 Y1 | 11/2003 |

* cited by examiner

*Primary Examiner* — Paul N Dickson
*Assistant Examiner* — Robert A Coker
(74) *Attorney, Agent, or Firm* — Patent Office of Dr. Chung Park

(57) ABSTRACT

Disclosed is a safety device for motorcycle, the safety device for motorcycle comprising: a supporting assembly installed onto both lateral side of the motorcycle body, with a plurality of parts of which are rotatable relative to each other; a supporting wheel installed onto the supporting assembly which is rotatable relative to the supporting assembly a push-pull unit that connects the supporting assembly to the motorcycle body, pushes the supporting assembly in order for the supporting wheel contacting with ground, and pulls the supporting assembly in order for the supporting wheel for taking off the ground; and a control unit that controls the push-pull unit. According to the present invention the motorcycle will not easily fall down when it stops for a moment in driving, the driver can easily support the motorcycle, and the motorcycle will not incline over a predetermined angle in driving curved path.

7 Claims, 7 Drawing Sheets

SAFETY APPARATUS FOR MOTORCYCLE

CROSS-REFERENCE TO PRIOR APPLICATIONS

This application is a continuation of application Ser. No. 13/389,045 filed on Feb. 6, 2012, which is a national Stage patent application of PCT International Patent Application No. PCT/KR2010/004264, filed on Jul. 1, 2010 under 35 U.S.C. §371, which claims priority of a Korean Patent Application No. 10-2009-0075110, filed on Aug. 14, 2009, which are all hereby incorporated by reference in their entirety.

TECHNICAL FIELD

The present invention relates to a safety device to be installed in a motorcycle.

BACKGROUND ART

In general, motorcycles are equipped with a body—or frame—on which handle bar 10 is mounted, two—a pair of—wheels 30 that are installed onto front and rear side of the body 20, an engine (not illustrated) for generating power that is mounted on the body, drivelines (not illustrated) that transfer the power generated by the engine, a brake system (not illustrated) that control revolution speed of wheels 30. The body is equipped with a saddle on which driver sit.

Driving power is generated by the engine of the motorcycle, and delivered to the wheels 30. The wheels 30 rotate by driving power delivered via the drivelines. The motorcycle drives by rotation of the wheels 30 that keep contact with the ground.

The brake system can be activated in order to stop the motorcycle.

The brake system reduces speed of revolution of the wheels 30 and then stops the wheels 30. By stopping the wheels 30 the motorcycle can be brought to a standstill.

The driver put each of his foot to the ground to support the motorcycle when the motorcycle is stopped. The motorcycle is almost perpendicular to the ground then. When the driver drives the motorcycle driving power generated by the engine is delivered to the wheels again to rotate the wheels.

In the meantime, the driver stands the motorcycle with the help of the supporting unit equipped on the body when he do not wishes to drive the motorcycle that is already in stopped status—when he wishes to park the motorcycle.

According to an example of the supporting unit, a rotatable stanchion is connected to lower part of the body, and the stanchion and the body is linked by a spring. In particular, one end of the stanchion is connected to a pin that is equipped on the body. One end of the spring is connected to the body and the other is connected to the other end of the stanchion.

The stanchion maintains horizontality against the ground when the motorcycle drives by the elastic force of the spring. The driver moves the stanchion to the position that is almost perpendicular to the ground when he stops the motorcycle. Then, he leans the motorcycle to the direction of the stanchion for the stanchion to contact with the ground. The stanchion, front wheel and rear wheel are supported by the ground so that the motorcycle can be a standstill. And the driver moves the stanchion to a position that is horizontal to the ground when he drives the motorcycle.

However, when the motorcycle stops for a moment in driving the driver sitting on the saddle should put each of his foot to the ground in order to support the motorcycle. If both of his feet do not reach for the ground coincidely, the driver should lean the motorcycle to a direction to support the motorcycle by one of his foot that reaches for the ground.

It do not require so much power to support the motorcycle—that is, a small amount of force is loaded to the foot of the driver—when it is perpendicular to the ground, because the center of mass of the motorcycle is perpendicular to contact point with the ground (when seen at the front). However, the driver will potentiate his foot to support the motorcycle—more amount of force will be loaded to the foot of the driver—when the motorcycle begins to tilt.

In particular, the heavier the motorcycle became, the more force loaded to the foot of the driver to support the motorcycle. If the driver can not stand the motorcycle by one foot when it is inclined, the motorcycle will fall down. It is not easy to stand the fallen down motorcycle again if the motorcycle is heavy by oneself.

Furthermore, the motorcycle is not much stable when parked after driving because it merely supported by a stanchion and two wheels.

DISCLOSURE OF THE INVENTION

Technical Problem

It is the goal of the present invention to provide solution for the driver to support the motorcycle in driving easily temporarily. And, for the driver to stand the motorcycle more stable after driving.

Technical Solution

In order to achieve the goal stated above the present invention is characterized in that the safety device the motorcycle comprises: a supporting assembly installed onto both lateral side of the motorcycle body, with a plurality of parts of which are rotatable relative to each other; a supporting wheel installed onto the supporting assembly which is rotatable relative to the supporting assembly; a push-pull unit that connects the supporting assembly to the motorcycle body, pushes the supporting assembly in order for the supporting wheel contacting with ground, and pulls the supporting assembly in order for the supporting wheel for taking off the ground; and a control unit that controls the push-pull unit.

It is desirable that the supporting assembly comprises a first part installed onto the motorcycle body detachably; a second part connected to the first part rotatably; and a third part connected to the second part rotatably, connected to the push-pull unit and connected to the supporting wheel.

It is desirable that the second part is rotatable relative to the first part for an end of the first part and an end of the second part connected by a first connection pin, the third part is rotatable relative to the second part for the other end of the second part and an end of the third part connected by a second connection pin, and the interior angle between the first connection pin and the second connection pin is below 90 degree.

It is desirable that the push-pull unit comprises: a connection part connected to the supporting assembly rotatably; an air cylinder that an end of which is connected to the motorcycle body rotatably, the other end of which—opened end of rod—is connected to the connection part rotatably; and a spring that an end of which is inserted into the rod, the other end is supporting a surface of the connection part.

It is desirable that the control unit comprises; a plurality of piping that link the push-pull unit and a pressure tank equipped within the motorcycle body, a valve unit that is connected to the pipings and controls flow direction of compressed air filled in the pressure tank, manipulation unit that controls the valve unit.

It is desirable that the manipulation unit is connected to the valve unit and comprises: a changeover switch that change status between auto mode and manual mode, a manual switch that is connected to the changeover switch, an auto switch that is enabled/disabled due to speed of the motorcycle body, and a speed sensor connected to the auto switch that detects speed of the motorcycle body.

It is desirable that the manipulation unit comprises: a first and a second open-close valve installed parallelly to each other onto the pipings that links the pressure tank and the valve unit, a changeover switch connected to the first open-close valve that change status between auto mode and manual mode, a manual switch that is connected to the changeover switch, an auto switch that is enabled/disabled due to speed of the motorcycle body, a speed sensor connected to the auto switch that detects speed of the motorcycle body, and a slope detection unit that detects slope of the motorcycle body when the motorcycle body is inclined over a predetermined angle.

It is desirable that the safety device for motorcycle further comprises: a pressure control unit that controls pressure escaping from the pressure tank with the movement of the push-pull unit.

Advantageous Effects

According to the safety device for motorcycle as of the present invention, the safety device pulls the supporting wheels that are equipped onto the body of the motorcycle when the motorcycle is driving so that the supporting wheels can be off from the ground. And, it pushes the supporting wheels so that they can reach for the ground when the motorcycle stops.

Therefore, the supporting wheels equipped onto the both side of the motorcycle moves to ground and support the body against the ground when the motorcycle stops for a moment, so the motorcycle body can be brought to a standstill even if the driver do not put his foot to the ground to support the motorcycle. This makes the driver more convenient and safe.

Furthermore, the motorcycle can be much more stable when parked after driving because the supporting wheels equipped both side of the body of the motorcycle support the body.

Furthermore, the supporting wheels keep the motorcycle from being fallen down when the motorcycle inclined over a predetermined angle in a curved path driving because the supporting wheel of incline direction reaches for the ground and supports the body against the ground.

Furthermore, the driver can easily make the motorcycle stand when it falls down by manipulating the control unit of falling direction so that the push-pull unit pushes the supporting assembly and the supporting wheels at the same time, and then the supporting wheels push the motorcycle body while it keep contact with the ground.

Furthermore, the supporting wheels keep the driver from being wounded when the motorcycle slide and fall down because the supporting wheels become in touch with the ground quickly.

BRIEF DESCRIPTION OF DRAWINGS

The foregoing and other objects, features and advantages of the present invention will become more apparent from the following detailed description when taken in conjunction with the accompanying drawings in which.

BEST MODE

Hereinafter, an embodiment of the safety device according to the present invention will be described with reference to the accompanying drawings.

Figure 1:
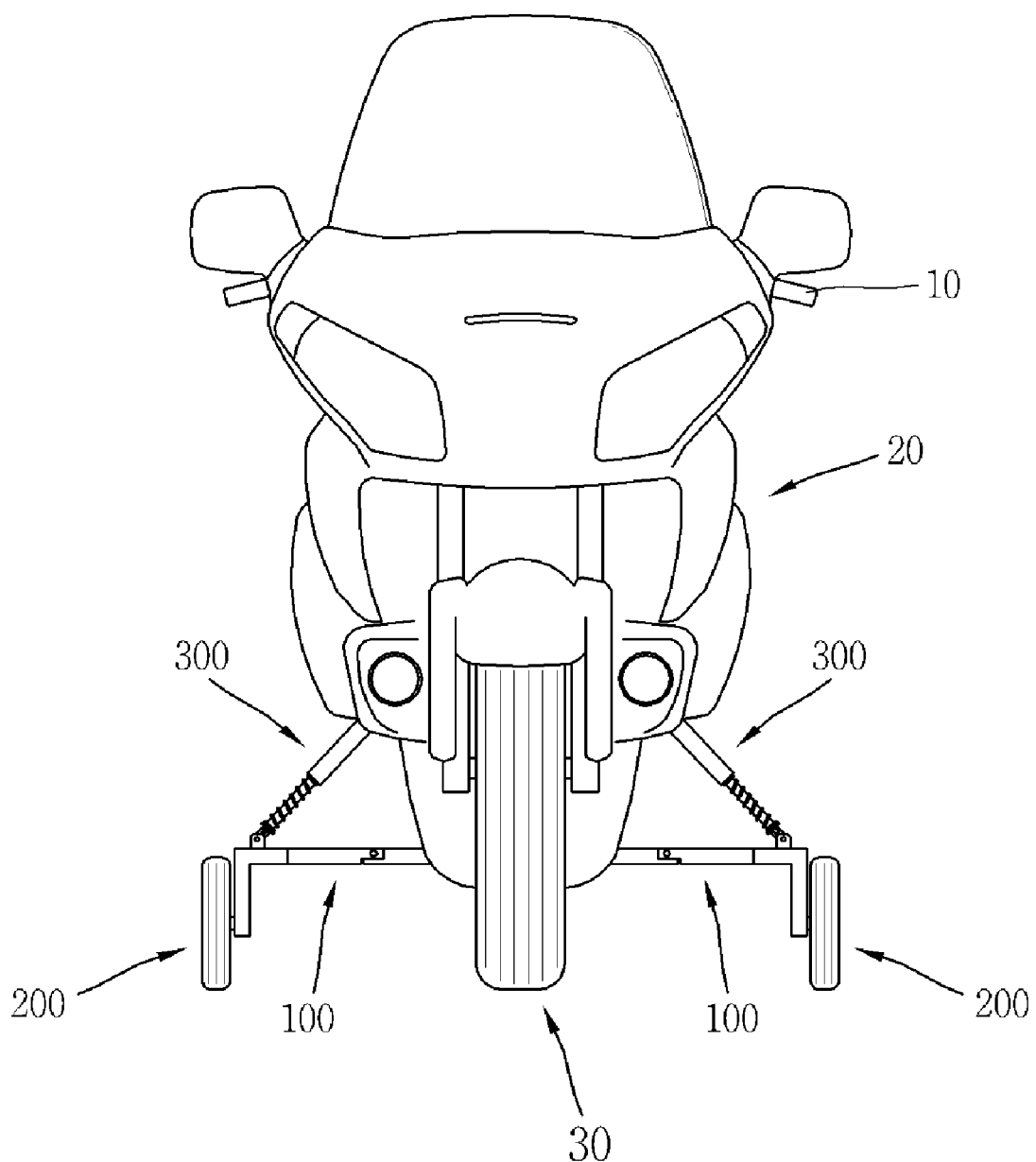
FIG. 1 shows front view illustrating an example of motorcycle
Figure 2:
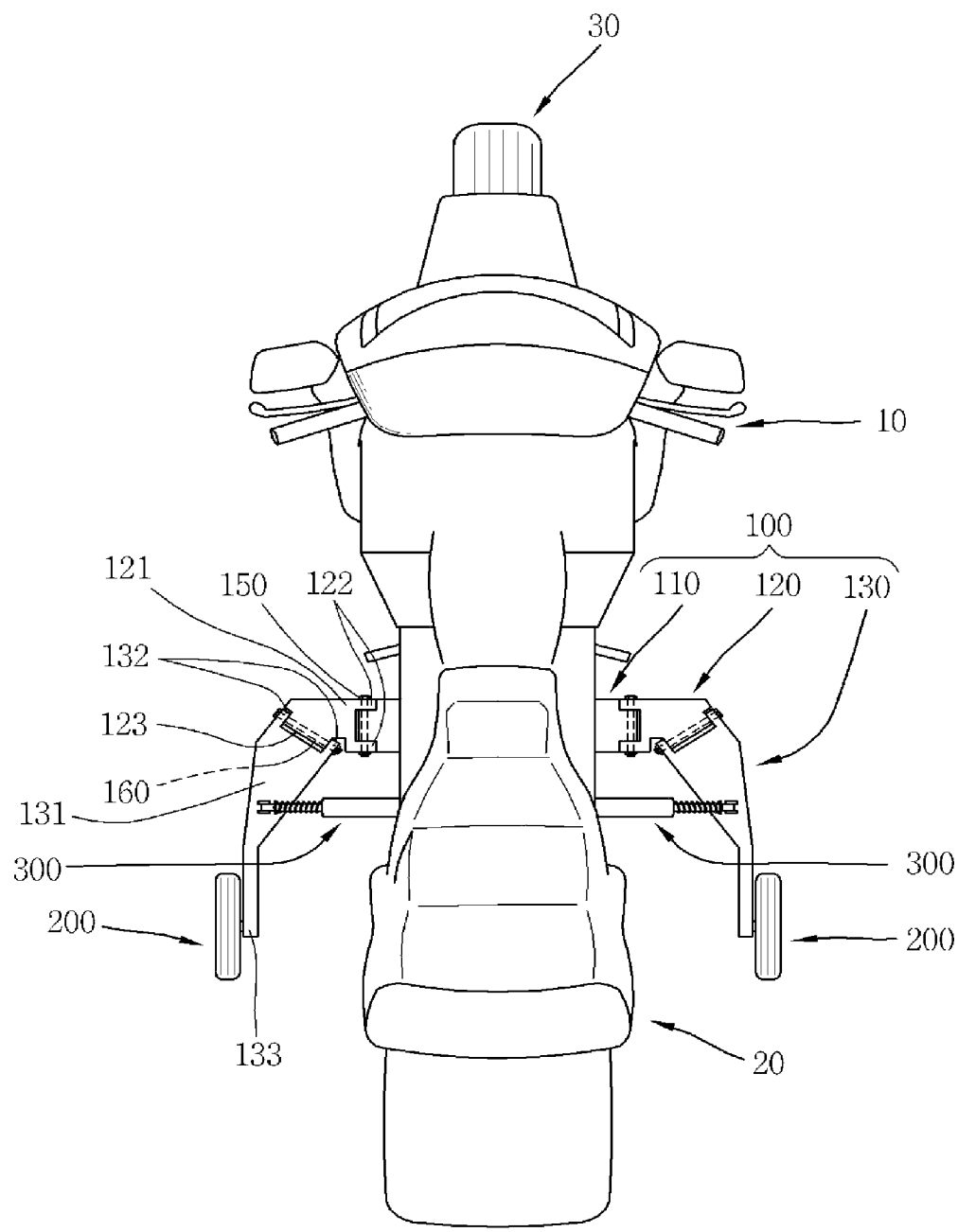
FIG. 2 shows plane view illustrating a motorcycle equipped with the safety device for motorcycle according to the present invention.
Figure 3:
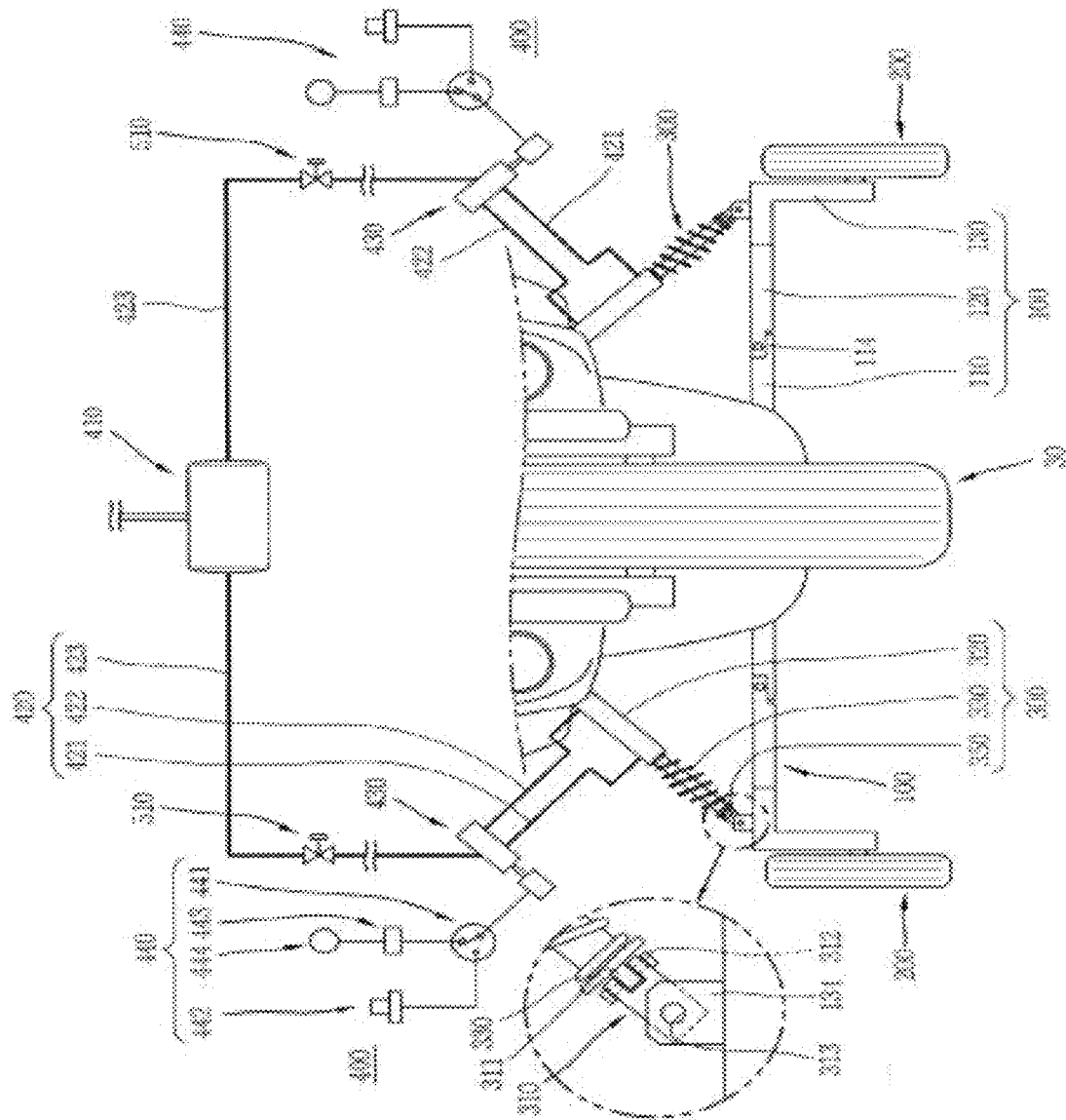
FIG. 3 shows partial front view illustrating a motorcycle equipped with the safety device for motorcycle according to the present invention.

FIG. 2 shows plane view illustrating a motorcycle equipped with the safety device for motorcycle according to the present invention, and FIG. 3 shows partial front view illustrating a motorcycle equipped with the safety device for motorcycle according to the present invention.

A first embodiment of the safety device according to the present invention will be described with reference to FIG. 2 and FIG. 3. The motorcycle comprises a body 20 equipped with a handle bar 10, two—a pair of—wheels 30 that are equipped onto front and rear side of the body 20, an engine (not illustrated) mounted on the body 20 for generating power, drivelines (not illustrated) that transfer the power generated by the engine, a brake system (not illustrated) that control revolution speed of wheels 30. The body 20 is equipped with a saddle on which driver sit.

A safety device for motorcycle according to the present invention is installed onto the motorcycle body 20.

The safety device comprises two supporting assemblies 100, two supporting wheels 200, push-pull units 300, and control units 400.

The two supporting assemblies 200 are installed to the both lateral side of the motorcycle body 20 detachably. The two supporting assemblies 200 are installed symmetrically around the motorcycle body 20. The supporting wheels 200 are equipped onto the supporting assemblies 100. The push-pull unit 300 that pushes of pulls the supporting assemblies 200 is equipped onto the both lateral side of the motorcycle body 20. The control units 400 that control the push-pull units 300 are equipped onto the both lateral side of the motorcycle body 20.

Hereinafter, a supporting assembly 100, a supporting wheel 200, a push-pull unit 300 and a control unit 400 installed onto one side of the motorcycle body 20 will be described.

The supporting assembly 100 comprises a first part 110 installed onto the motorcycle body detachably, a second part 120 connected to the first part rotatably (moveably), and a third part 130 connected to the second part rotatably (moveably).

Figure 4:
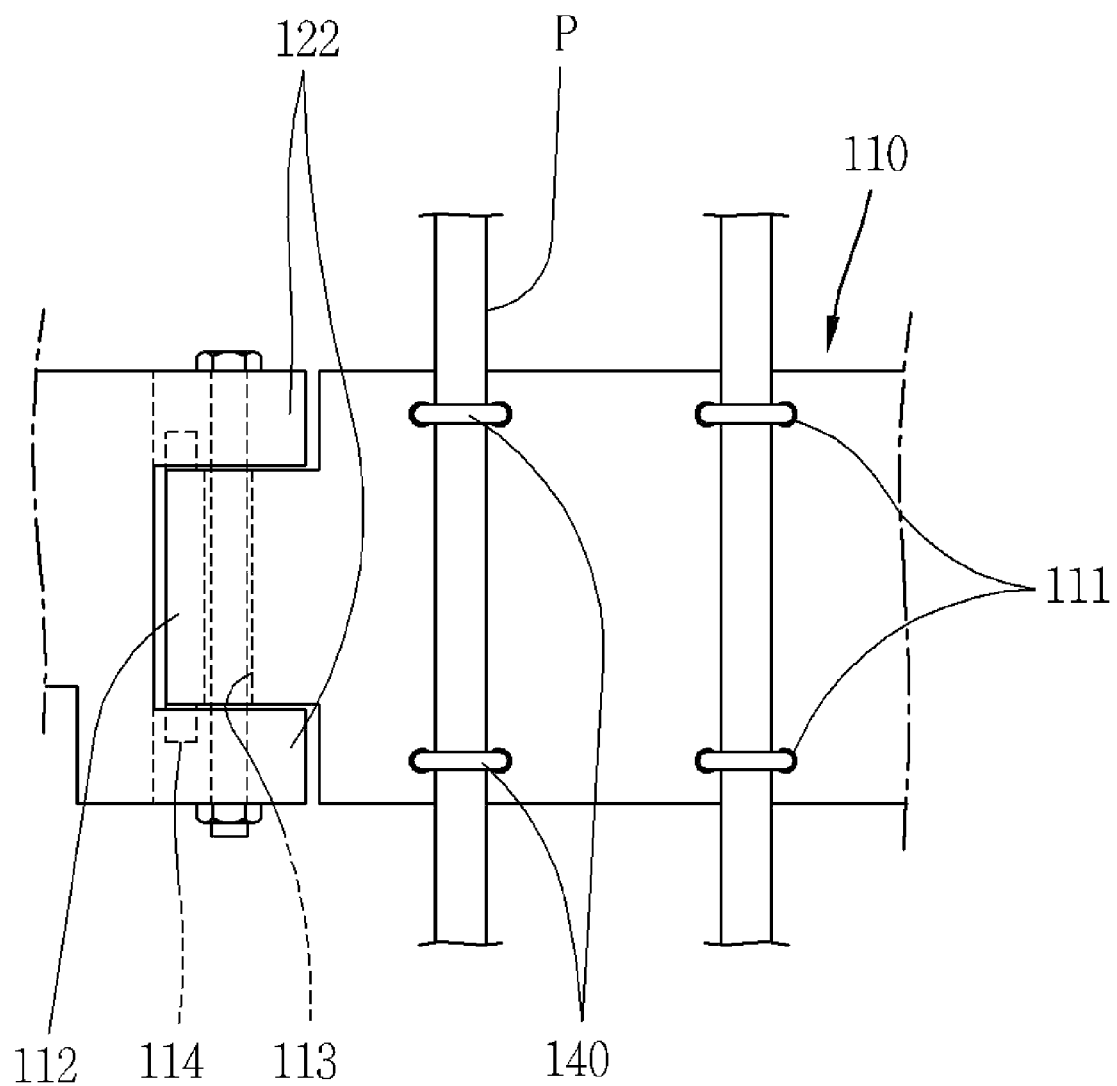
FIG. 4 shows partial plane view illustrating a supporting assembly which is a part of the safety device for motorcycle.

It is desirable that the first part 110 has predetermined thickness and rectangular extent as illustrated in FIG. 4. A plurality of first penetration holes 111 are perforated on a side of the first part 110, and a connection part 112 is formed on the other side of the first part 110. The connection part 112 has uniform width and predetermined length. A second penetration hole 113 is perforated across the connection part 112. The second penetration hole 113 is perforated along the widthwise direction of the connection part 112.

The first part 110 is connected by the pipes P that are part of the motorcycle body 20 detachably by a plurality of U-shaped bolts 140 and nuts (not illustrated) tighten by the bolts 130.

The U-shaped bolts 140 surround the pipes P and are inserted to the first penetration holes 111. Then the nuts are tightened with the U-shaped bolts 140.

The second part 120 comprises a body 121, first connection parts 122 equipped on one end of the body 121, second connection parts 123 equipped on the other end of the body 121.

It is desirable that the body 121 of the second part 120 has predetermined thickness and a circular arc extent. The first connection part 122 comprises two projections that are formed on one end of the body 121. The two projections has predetermined distance in between, the distance between the two projections equals or is longer than the width of the connection part 112 of the first part 110. Each of the two projections has penetration hole on it and the center of the two penetration holes exist on the same line. The second connection part 123 protruded on the other end of the body has predetermined width and length. A penetration hole is perforated across the connection part 123, the penetration hole is perforated along the widthwise direction of the second connection part 123.

The first connection part 122 of the second part 120 is connected to the connection part 112 of the first part 110. That is, the connection part 112 of the first part 110 is inserted between the two projections of the first connection part 122.

The interior angle between the center line of the penetration holes of the first connection part 112 and the center line of the penetration holes of the second connection part 113 is below 90 degree. A first connection pin 150 is inserted through the penetration hole of the first part 110 and the penetration hole of the first connection part 122 of the second part 120. A bolt can be inserted as a substitution of the first connection pin 150.

The second part 120 is movable with the first connection pin 150 as an axis of movement while the first part 110 is fixed. It is desirable that a stopper 114 is equipped on the first part in order to keep the second part 120 from moving below (under) the horizontal position against the first part 110 while the first part 110 is fixed.

It is desirable that the stopper 140 comprises projections that are protruded on the connection part 112 of the first part 114.

The second part 120 rotates with the first connection pin as an axis of rotation until it is blocked by the stopper 114 at the horizontal position against the first part 110.

The third part 130 comprises a body 131, a connection part 132 formed on one end of the body 131, and installment part 133 formed on the other end of the body 131. It is desirable that the body 131 of the third part 130 has predetermined length and curved shape (when seen from the front). The connection part 132 of the third part 130 is composed of two projections that are protruded on one end of the body 131. The two projections have predetermined distance in between, and the distance between the two projections equals or is longer than the width of the second connection part 123 of the second part 120. A penetration hole is perforated on each of the two projections, the center line of the two penetration holes exist on the same line. The installment part 133 is formed in order for the supporting wheel 200 being detachable. It is desirable that the installment part 133 is a spindle that is combined with an end of the body 131. The spindle and the body 131 can be made as one part.

The connection part 132 of the third part 130 and the second connection part 123 of the second part 120 is connected together. That is, the connection part 132 of the third part 130 is inserted between the projections of the second connection part 123. A second connection pin 160 is inserted through the penetration holes of the connection parts of the second part 120 and the third part 130. The third part 130 can move (rotate) with the second connection pin 160 as an axis of movement while the second part 120 is fixed.

The supporting wheel 200 is installed on the installment part 133 of the third part 130. It is desirable that bearings are installed on the installment part 133, then the supporting wheel 200 is mounted on that.

According to a different embodiment of the supporting assembly 100, the supporting assembly 100 comprises two parts and connection pins that enable the rotation of the two parts. That is, it is possible to make the second part and the third part as one part. Herein, one part is connected to the motorcycle body 20, and the other is connected to the supporting wheel 200.

The push-pull unit 300 connects the motorcycle body 20 and the supporting assembly 100, pushes the supporting assembly 100 to the ground so that the supporting 200 wheel reaches for the ground, or pulls the supporting assembly 100 to the motorcycle body 20 so that the supporting wheel 200 can be off from the ground.

According to an embodiment of the push-pull unit 300, the push-pull unit 300 comprises a connection part 310 connected to the supporting assembly rotatably, an air cylinder 320 that connects the motorcycle body 20 and the connection part 310, and a spring installed onto the air cylinder 320.

A slit 311 equipped on the connection part 310 has predetermined width and depth. The slit 311 penetrate a side surface of an end of the connection part 310. One end surface of the connection part 310 has opening on it.

The connection part 310 has slit 311 and penetration hole 312 on each side of one end part. Center line of the two holes 312 exists on the same line. A penetration hole 313 is formed on the other end of the connection part 310. The center line of the two penetration holes 312 and that of the penetration hole 313 is perpendicular to each other.

The third part 130 that is a part of the supporting assembly 100 has combination part 134 where an end of the connection part 310 is connected to rotatably. The combination part 134 is composed of two blocks formed on upper side of the third part 130. The two blocks have predetermined distance. A hole is perforated on each of the two blocks while the two holes have the same center line. An end part of the connection part 310 is inserted between the two blocks, bolt is inserted through the penetration hole 313 of the connection part 310 and holes of the two blocks. Nut is tightened with the bolt.

The air cylinder 320 has cylinder body 321 and rod 322 that is inserted into the cylinder body 321. A first port 323 is formed on one side of the cylinder body 321 while a second part 324 is formed on the other side of the cylinder body 321. Inflow of compressed air can be made into the cylinder body 321 through the first port 323 and the second port 324 of the cylinder body 321, or outflow of the compressed air can be made out of the cylinder body 321. Difference between the pressure that influence the first port 323 and the pressures that influence the second port 324 move the rod 322. Concrete explanation will not be disclosed because the air cylinder 320 belongs to prior art.

The body 321 of the air cylinder 320 is connected to the motorcycle body 20. A penetration hole is formed along perpendicular direction to the center line of the rod 322 on an end of rod 322 of the air cylinder 320. One end of the rod 322 is inserted into the slit 311 of the connection part 310. Bolt is inserted into the penetration hole of the rod 322 and that of the connection part 310. Nut is tightened with the bolt.

The spring 330 is inserted into the rod 322. It is desirable that the spring 330 is compressed coil spring. One end of the spring 330 supports one side of cylinder body 321 and the other end supports one side of the connection part 310.

The rod 322 of the air cylinder 320 and the third part 130 can be combined with ball joint.

The body 321 of the air cylinder 320 can be connected to the motorcycle body 20 moveably.

A stopper (not illustrated) can be equipped which has predetermined length. The stopper keeps the second part 120 or the third part 130 from being too close to the motorcycle body when the push-pull unit 300 pulls the supporting assembly 100 to the direction of the motorcycle body 20.

The control unit 400 applies pressure to air cylinder 320 through the first port 323 or the second port 324 selectively. The rod 322 of the air cylinder 320 comes out of the body 321 of the cylinder when the control unit 400 apply pressure to the second port 324 of the air cylinder 320 while does not apply pressure to the first port 323 of the air cylinder 320.

And the rod 322 of the air cylinder 320 moves into the body 321 of the cylinder when the control unit 400 apply pressure to the first port 323 of the air cylinder 320 while does not apply pressure to the second port 324 of the air cylinder 320.

The rod 322 pushes the supporting assembly 100 when it comes out of the cylinder body 321, and the rod 322 pulls the supporting assembly 100 to the direction of the motorcycle body 20 when it moves into the cylinder body 321.

The spring 330 absorbs impact that applied to the supporting wheel 200 when the supporting wheel 200 contacts with the ground with the rod 322 come out of the cylinder body 321. Furthermore, with the help of the elastic force of the spring 330 the rod 322 will not come into the cylinder body 321 even if inner pressure of the cylinder body 321 get lower when the supporting wheel 200 contacts with the ground with the rod 322 come out of the cylinder body 321. By this, the push-pull unit 300 supports the supporting assembly 100.

Figure 5:
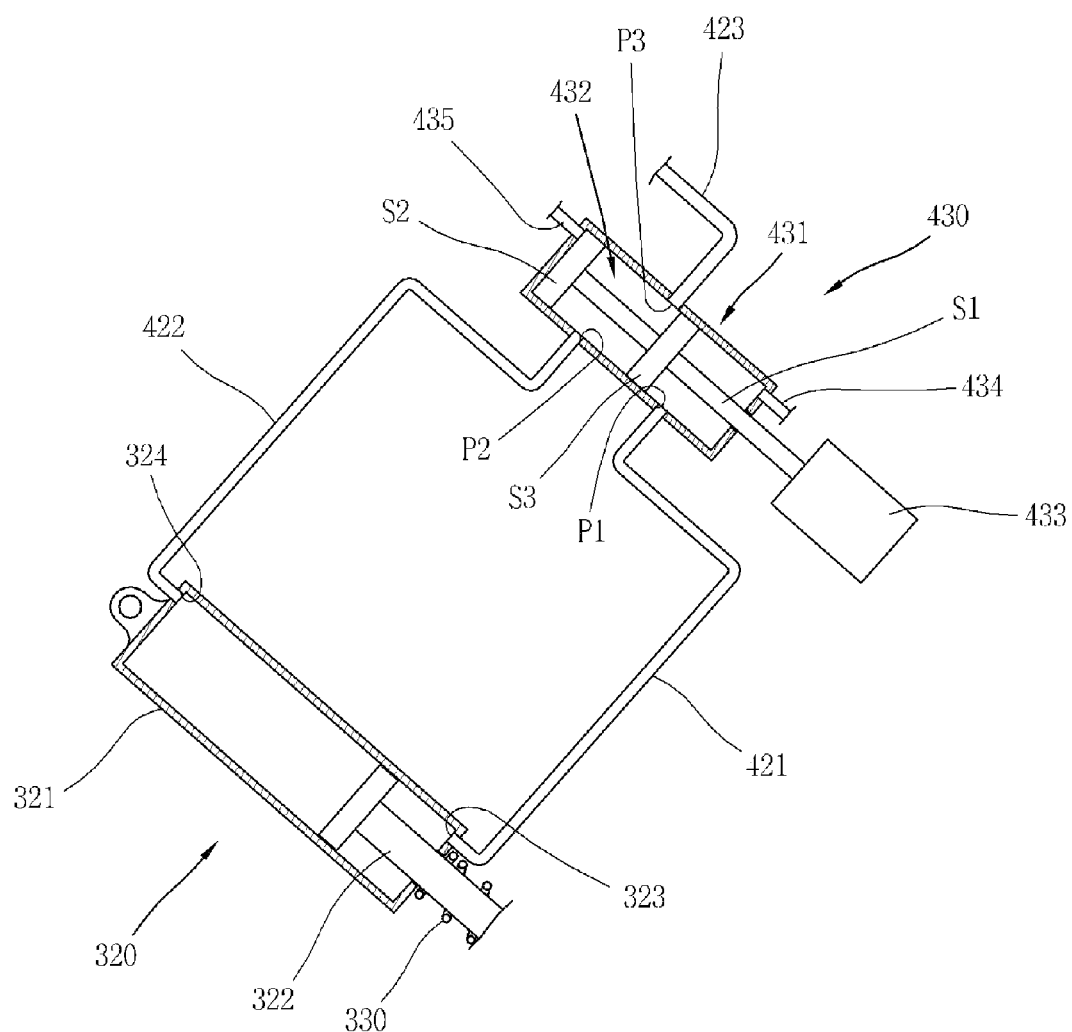
FIG. 5 shows piping diagram illustrating an embodiment of a pressure control unit which is a part of the safety device for motorcycle.

According to a first embodiment of the control unit 400, as illustrated in FIG. 3 and FIG. 5, the control unit 400 comprises a pressure tank 410 equipped within the motorcycle body 20, a plurality of piping 420 that link the push-pull unit 300 with the tank 410, a valve unit 430 that is connected to the pipings 420 and controls flow direction of compressed air filled in the pressure tank 410, and a manipulation unit 440 that controls the valve unit 430.

The pressure tank 310 is connected to a compressor (not illustrated) that is a part of the motorcycle body 20. The pressure tank maintains inner pressure at predetermined value with the help of the compressor.

The pipings 420 comprises a first piping 421 that link the first port 323 of the air cylinder 320 with the valve unit 430, a second piping 422 that link the second port 324 of the air cylinder 320 with the valve unit 430, and a third piping 423 that link the pressure tank 410 and the valve unit 430.

The valve unit 430 comprises a body part 431 that has cylindrical sealed space in it, a spool 432 inserted into the body part 431 moveably, and a driving unit 433 that drives the spool in a round trip on a straight line.

It is desirable that the body part 431 is cylindrical. A first vent pipe 434 and a second vent pipe 435 is formed on both side of the body part 431. A first port P1, a second port P2, and a third port P3 are equipped on both side of the body part 431. The first piping 421 is linked to the first port P1 of the body part 431. The second piping 422 is linked to the second port P2 of the body part 431. The third piping 423 is linked to the third port P3 of the body part 431. There is predetermined distance between the first port P1 and the second port P2 of the body part 431. The third port P3 of the body part 431 is located between the first port P1 and the second port P2.

The spool 432 comprises an axis part S1, a first circular plate part S2 equipped on one end of the axis part S1, a second circular plate part S3 equipped on the axis part S1 at a position off from the first circular plate part S2 in predetermined distance.

The first circular plate part S2 has predetermined thickness and uniform external diameter, and has circular plate shape.

The second circular plate part S3 has predetermined thickness and uniform external diameter, and has circular plate shape.

The first circular plate part S2 and the second circular plate part S3 are inserted into the body part 431, and one end of the axis part S1 penetrate one side of the body part 431. A part of the axis part S1 that penetrate out of the body part 431 is connected to the driving unit 433.

It is desirable that the driving unit 433 is actuator. The driving unit 433 can be a linear motor. The driving unit 433 can be implemented in various ways.

The third port P3 and the second port P2 of the body part 431 are linked when the first circular plate part S1 contacts on one side of the body part 431 with the driving unit 433 pushes the spool 432.

The third port P3 and the first port P1 of the body part 431 are linked when the first circular plate part S1 exists between the third port P3 and the second port P2 of the body part 431 with the driving unit 433 pulls the spool 432.

Compressed air of the pressure tank 410 flows into the air cylinder 321 through the third piping, the second piping and the second port 324 of the air cylinder 320 when the third port P3 and the second port P2 of the body part 431 linked, and pushes the rod 322.

Compressed air of the pressure tank 410 flows into the air cylinder 321 through the third piping 423, the first piping 421 and the first port 323 of the air cylinder 320 when the third port P3 and the first port P1 of the body part 431 linked, and pulls the rod 322 into the cylinder body 321.

The manipulation unit 440 comprises a changeover switch 441 that change status between auto mode and manual mode, a manual switch 442 that is connected to the changeover switch, an auto switch 443 that is enabled/disabled due to speed of the motorcycle body, and a speed sensor 444 connected to the auto switch that detects speed of the motorcycle body.

The speed sensor 444 can be the speed gage of the motorcycle (not illustrated). Furthermore, the speed sensor 444 can be mounted on the wheel 30 of the motorcycle.

The manipulation units 440 are equipped on both side of the motorcycle body 20. It is desirable that the two manipulation units 440 share a speed sensor 444 rather than have its own speed sensor 444 respectively.

The auto switch 443 is enabled when the speed detected by the speed sensor 444 is under predetermined speed, and is disabled when the speed is over predetermined speed.

When the auto switch 443 is enabled the driving unit 433 pushes the spool 432, and when the auto switch 443 is disabled the driving unit 433 pulls the spool 432.

It is desirable that the changeover switch 441 and manual switch 442 is installed on handle of the motorcycle body 20.

The changeover switch 441 changes mode into manual mode when the driver select manual with the manipulation unit 440. And when the driver enables the manual switch 442, the driving unit 433 pushes the spool 432. By pushing the spool 432, the third piping 423 and the second piping 422 can be linked. The rod 322 of the air cylinder 320 comes out of the cylinder body 321 and pushes the supporting assembly 100 with the help of compressed air of pressure tank 410 when the third piping 423 and the second piping 422 is linked.

And, when the driver disables the manual switch 442, the driving unit 433 pulls the spool 432. By pulling the spool 432, the third piping 423 and the first piping 421 can be linked. The rod 322 of the air cylinder 320 pulls the supporting assembly 100 with the help of compressed air of the pressure tank 410 when the third piping 423 and the first piping 421 linked.

In the meantime, the changeover switch 441 changes into auto mode when the driver select auto with the manipulation unit. In auto mode, auto switch 443 is enabled when the speed of the motorcycle—speed of the wheels 30 of the motorcycle—is below the predetermined value so that the driving unit 433 pushed the spool 432. And when the speed of the motorcycle is over the predetermined value the auto switch 443 is disabled so that the driving unit 433 pulls the spool 432.

In the meantime, it is desirable to increase pressure applied to the air cylinder 320 when the rod 322 is pulled into the cylinder body 321 in order for the supporting wheels 200 being off from the ground because the spring 330 inserted into the rod 322 is compressed. It is desirable that a pressure control unit 500 that controls pressure of air flows that leaks with the movement of the rod 322 of the air cylinder 320 out of the pressure tank 410 is equipped on the pipings 420 and the push-pull unit 300.

Figure 6:
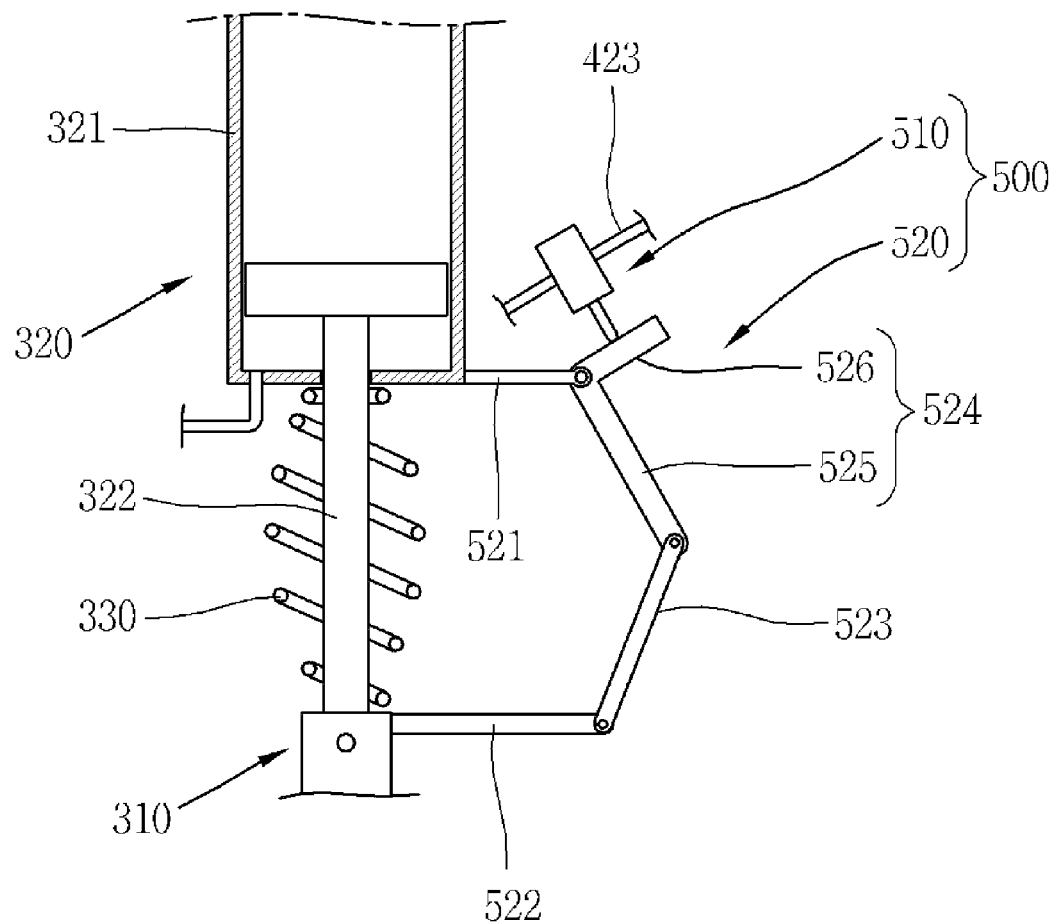
FIG. 6 shows plane view illustrating a pressure control unit which is a part of the safety device for motorcycle.

The pressure control unit 500, as illustrated in FIG. 6, comprises a regulator 510 that control pressure equipped on the third piping 423, a regulator control unit 520 that control the regulator 510 with the movement of rod 322 of the air cylinder 320.

According to an embodiment of the regulator control unit 520, the regulator control unit 520 comprises a first bar 521 equipped on the cylinder body 321, a second bar 522 equipped on the connection part 310, a third bar 523 connected rotatably to one end of the second bar 522, and a fourth bar 524 that connects the first 521 and the third bar 310, and controls the regulator by the movement of the rod 322 or the connection part 310. The fourth bar 524 has connection part 525, and contact part 526 that is protruded and bended from connection part 525 and contacts with the regulator 510. One end of the connection part 525 is connected to another end of the third bar 523 rotatably, and the other end of the connection part 525 is connected to the first bar 521 rotatably.

The second bar 522 moves when the rod 322 is pulled into the cylinder body 321 or comes out of the cylinder body 321. The contact part 526 controls the regulator 510 with the movement of the third bar 523 and the fourth bar 524 initiated by the movement of the second bar 522.

The regulator control unit 520 controls the regulator 510 in order to increase the compressed air applied to the air cylinder 320 when the rod 322 is pulled into the cylinder body 321, and the regulator control unit 520 controls the regulator 510 in order to decrease the compressed air applied to the air cylinder 320 when the rod 322 comes out of the cylinder body 321.

The regulator control unit can be implemented in various ways.

MODE FOR INVENTION

Figure 7:
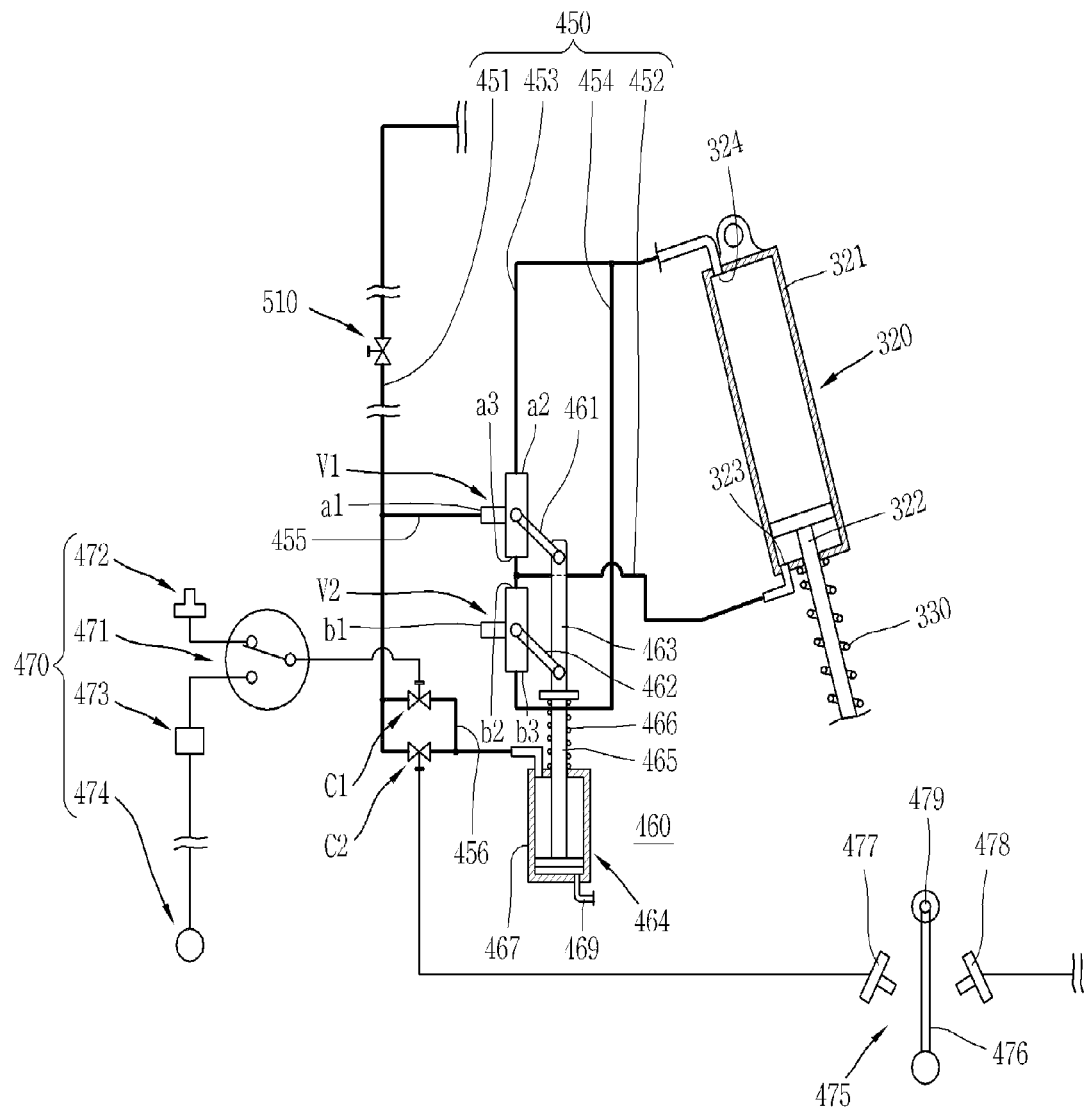
FIG. 7 shows piping diagram illustrating other embodiment of a pressure control unit which is a part of the safety device for motorcycle.

According to a second embodiment of the control unit 400, as illustrated in FIG. 7, the control unit 400 comprises a pressure tank 410 equipped on the motorcycle body 20, a plurality of piping 450 that link the push-pull unit 300 and a pressure tank 410, a valve unit 460 that controls flow direction of compressed air filled in the pressure tank 410, a manipulation unit 470 that controls the valve unit.

The pressure tank 410 is connected to a compressor that is a part of the motorcycle body 20. The pressure tank 410 maintains inner pressure at predetermined value with the help of the compressor (not illustrated).

The pipings 450 comprise a first piping 451 that links the pressure tank 410 and the valve unit 450, a second piping 452 that links the first port 323 of the air cylinder 320 which is a part of the push-pull unit 300 and the valve unit 450, a third piping 453 that links the second port 324 of the air cylinder 320 and the valve unit 450, and a fourth piping 454 that is a branch of the third piping 453 and is linked to the valve unit 450. One end of the fourth piping 454 is connected to the third piping 453 that is near the second port 324 of the air cylinder 320.

The valve unit 460 comprises a first 3 way vale V1, a second 3 way valve V2 that is connected to the first 3 way valve V1, a connection bar 463 that connects a switch bar 461 of the first 3 way valve V1 and a switch bar 462 of the second 3 way valve V2, and supplementary air cylinder 464 that is connected to the connection bar 463 and moves the connection bar 463 in a round trip on a straight line. The connection bar 463 is connected to the rod 465 that is a part of the supplementary air cylinder 464. It is desirable that a spring 466 is inserted into the rod 465 of the supplementary air cylinder 464, and the spring 466 is compressed coil spring.

The switch bar 461 of the first 3 way valve V1 is connected to the connection bar 463 rotatably. The switch bar 462 of the second 3 way valve V2 is connected to the connection bar 463 rotatably.

The first piping 451 is connected to the supplementary air cylinder 464. A branch piping 455 is connected to the first piping, and the branch piping 455 is connected to a first port a1 of the first 3 way valve. A second port a2 of the first 3 way valve V1 is connected to the third piping 453. A third port a3 is connected to a second port b2 of the second 3 way valve V2.

The first port b1 of the second 3 way valve is where air emitted. A third port b3 of the second 3 way valve is connected to the fourth piping 454. The second piping 452 is connected to the piping that the first 3 way valve V1 and the second 3 way valve V2 are connected to.

The manipulation unit 470 comprises a first open-close valve C1 and a second open-close valve C2 that are parallel relative to each other, a changeover switch 471 connected to a first open-close valve C1 that changes between auto mode and manual mode, a manual switch 472 that is connected to the changeover switch 471, an auto switch 473 that are enabled/disabled according to the speed of the motorcycle body, a speed sensor connected to the auto switch 473 that detect the speed of the motorcycle, and a slope detection unit 475 connected to the second open-close valve C2 that open/close the second open-close valve C2 according to the inclination angle of the motorcycle body 20 when the motorcycle body 20 is inclined over predetermined angle.

The first and second open-close valve C1, C2 is equipped on the first piping 451 for they can be adjacent to the supplementary air cylinder 464. The first open-close valve C1 equipped on the first piping 451 open/close the first piping 451. And, a parallel connection piping 456 is linked to the first piping 451, one end of the parallel connection piping 456 is linked to the first piping 451 at the position that is adjacent to one side of the first open-close valve C1 while the other end of the parallel connection piping 456 is linked to the first piping 451 at the position that is adjacent to the other side of the first open-close valve C1. The second open-close valve C2 is equipped on the parallel connection piping 456, the second open-close valve C2 and the first open-close valve C1 are parallel relative to each other.

Pressure of the pressure tank 410 is applied to the supplementary air cylinder 464 via the first piping 451 when the first open-close valve C1 or the second open-close valve C2 is opened.

Then the rod 465 of the supplementary air cylinder 646 is pulled into the cylinder body 467 so that the rod 465 pulls the connection bar 463.

When the first open-close valve C1 and the second open-close valve C2 are closed, the rod 465 come out to the cylinder body 467 and pulls the connection bar 463 by elastic force of the spring 466 because pressure of the pressure tank 410 is no longer applied to the supplementary air cylinder 464.

When the rod 465 of the supplementary air cylinder 464 pulls the connection bar 463, the first port a1 and the second port a2 of the first 3 way valve V1 are linked while the third port a3 is closed, and the first port b1 and the second port b2 of the second 3 way valve V2 are linked, while the third port b3 is closed. By this, compressed air in the pressure tank 410 is applied to a surface of the rod 322 via the first port a1, the second port a2 of the first 3 way valve V1, the third piping 453, and the second port of the air cylinder 320 so that the rod 322 come out of the air cylinder body 321. Herein, air filled in the cylinder body 321 of the other side of the rod 322 of the air cylinder 320 is exhausted via the first port 323 of the air cylinder 320, the second piping 452 and the first port b1, the second port b2 of the second 3 way valve V2. The rod 322 pushed the supporting assembly 100 when the rod 322 of the air cylinder 320 comes out of the cylinder body 321. When the rod 465 of the supplementary air cylinder 464 pushes the connection bar 463, the first port a1 and the third port a3 of the first 3 way valve V1 are linked while the second port a2 is closed, the first port b1 and the third port b3 of the second 3 way valve V2 are linked while the second port b2 is closed. By this, compressed air in the pressure tank 410 is applied to the other surface of the rod 322 that is placed in the air cylinder body 321 via the first port a1, the third port a3 of the first 3 way valve V1, the second piping 452 and the first port 323 of the air cylinder so that the rod 322 of the air cylinder 320 is pulled into the air cylinder body 321. Herein, air filled in the air cylinder body 321 of the other surface of the rod 322 of the air cylinder is exhausted via the second port 324 of the air cylinder 320, the third piping 453, the fourth piping 454 and the first port b1, the third port b3 of the second valve V2. The rod 322 of the air cylinder 320 pulls the supporting assembly 100 when the rod 322 of the air cylinder 320 is pulled into the air cylinder body 320.

An exhaust pipe 469 which is not explained above is equipped.

It is desirable that the changeover switch 471 and the manual switch 472 are installed on the handle of the motorcycle body 20. The driver operate the changeover switch 471. When the changeover switch 471 is selected as manual mode, the driver can enable/disable the manual switch 472 in order to open/close the first open-close valve C1. When the changeover switch 471 is auto mode, the auto switch 473 is enabled when the speed of the motorcycle detected by the speed sensor 474 is below predetermined value so that the first open-close valve C1 is opened. While the speed of the motorcycle is over predetermined value the auto switch 473 is disabled so that the first open-close valve C1 is closed.

The control units 400 are equipped on both side of the motorcycle body 20. It is desirable that the two control units 400 share one speed sensor 474 that is a part of the control unit 400 rather than have its own speed sensor 474 respectively.

Compressed air in the pressure tank 410 is applied to the supplementary air cylinder 464 when the first open-close valve C1 opened, and is no longer applied to the supplementary air cylinder 464 when the first open-close valve C1 closed.

The slope detection unit 475 comprises a stick 476 equipped on a side of the motorcycle body 20 that can move as a pendulum, a first limit switch 477 and a second limit switch 478 that are placed in a predetermined distance from the stick 476 when the stick 476 is perpendicular.

A penetration hole is perforated on one end of the stick 476. A pin 479 is equipped on the motorcycle body 20. The pin 479 is inserted into the penetration hole of the stick 476. The stick 476 moves as a pendulum with the pin 479 as an axis of movement.

It is desirable that the first limit switch 477 is placed on the left side, the second limit switch 478 is placed on the right side of the stick 476 when the motorcycle is seen at the front. The first limit switch 477 is connected to the second open-close valve C2 of the control unit 400 that is placed on the left side of the motorcycle body 20, while the second limit switch 478 is connected to the second open-close valve C2 of the control unit that is placed on the right side of the motorcycle body 20.

The stick 476 touches the first limit switch 477 when motorcycle is inclined to the left side over predetermined value when the motorcycle is seen at the front. And the stick 476 touches the second limit switch 478 when motorcycle is inclined to the right side over predetermined value when the motorcycle is seen at the front. And, the stick 476 will not touch the first limit switch 477 or the second limit switch 478 when the motorcycle is perpendicular or inclined within tolerable angle.

The second open-close valve C2 is opened when the stick 476 touches the first limit switch 477, and is closed when the stick 476 do not touches the first limit switch 477. Compressed air in the pressure tank 410 is applied to the supplementary air cylinder 464 when the second open-close valve C2 is opened, but compressed air in the pressure tank 410 is no longer applied to the supplementary air cylinder 464 when the second open-close valve C2 is closed.

The second open-close valve C2 is opened when the stick 476 touches the second limit switch 478 of the right side, and is closed when the stick 476 do not touches the second limit switch 487.

According to a second embodiment of the control unit 400, it is desirable that the control unit 400 comprises a pressure control unit equipped onto the pipings and the push-pull unit to control pressure escaping from the pressure tank 410 with the movement of the rod 322 of the air cylinder 320.

The pressure control unit comprises a regulator equipped on the first piping 451, a regulator control unit that controls the regulator with the movement of the rod. Composition of the pressure control unit is not different from that of above explained the pressure control unit.

Supplementary brake system (not illustrated) can be equipped to the supporting assembly 100 in order to control the revolution speed of the supporting wheels 200.

Hereinafter, effectiveness of the safety device according to the present invention is disclosed.

At first, the push-pull unit 300 pulls the supporting assembly 100 so that the second part 120 and the third part 130 of the supporting assembly 100 become close to the motorcycle body 20. Herein, the supporting wheel 200 installed onto the third part 300 is off from the ground and is moved close to the motorcycle body 20. Therefore, the supporting wheel 200 will not contact the ground while the motorcycle is driving.

When the driver wishes to stop the motorcycle in driving he operates the brake system. Rotation speed of the wheel 200 is decreased when the break system is operated.

The driver operate the control unit 400 so that the push-pull unit 300 pushes the supporting assembly 100 to the ground when the safety device is in manual mode. The second part 120 and the third part 130 are unfolded when the push-pull unit 300 pushes the supporting assembly 100. The supporting wheel 200 rotates in contact with the ground when the second part 120 and the third part 130 are unfolded. The motorcycle can be at a standstill even if the motorcycle stops for the supporting wheels 200 that are equipped on both side of the motorcycle body 20 keep contact with the ground.

And the driver operate the control unit 400 in order for the push-pull unit 300 pulls the second part 120 and the third part 130 of the supporting assembly 100 to the direction of the motorcycle body 20 when the motorcycle starts driving again after stopping for a moment. The supporting wheels 200 moves close to the motorcycle body 20 after taking off from the ground when the push-pull unit 300 pulls the second part 120 and the third part 130 to the direction of the motorcycle body 20. The motorcycle moves the supporting wheels 200 to the direction of the motorcycle body 20 then the motorcycle starts driving again.

In the meantime, the control unit 400 controls the push-pull unit 300 in order for the push-pull unit 300 to push the second part 120 and the third part 130 of the supporting assembly 100 when the rotation speed of the wheel 30 of the motorcycle is below predetermined value by the break system with the control unit 400 selected as auto mode by the driver.

The second part 120 and the third part 130 are unfolded when the push-pull unit 300 pushes the supporting assembly 100. The second part 120 and the third part 130 are unfolded when the push-pull unit 300 pushes the supporting assembly 100. The supporting wheel 200 rotates in contact with the ground when the second part 120 and the third part 130 are unfolded. The motorcycle can be at a standstill even if the motorcycle stops for the supporting wheels 200 that are equipped on both side of the motorcycle body 20 keep contact with the ground.

When the motorcycle starts driving again after stopping for a moment and the rotation speed of the wheel is over predetermined value, the control unit 400 control the push-pull unit 300 to pull the second part 120 and the third part 130 of the supporting assembly 100 to the direction of the motorcycle body 20. The supporting wheels 200 moves close to the motorcycle body 20 after taking off from the ground when the push-pull unit 300 pulls the second part 120 and the third part 130 to the direction of the motorcycle body 20. The operation of controlling the push-pull unit 300 of the control unit 400 is as of the explanation stated above.

The driver can park the motorcycle with the support wheels in contact with the ground when he stops the motorcycle and does not wish to drive the motorcycle anymore.

In the meantime, the motorcycle would fall down when the motorcycle inclined over predetermined angle when the motorcycle is driving a curved path. According to the second embodiment of the control unit 400 controls the push-pull unit 300 of inclination direction so that the push-pull unit 300 to push the second part 120 and the third part 130 when the slope detection unit 475 detects inclination of the motorcycle body 20. It is possible to keep the motorcycle from being fell down with the help of the supporting wheel 200 of inclination direction that the supporting wheel 200 keeps contacts with the ground when the push-pull unit 300 to push the second part 120 and the third part 130.

That is, the supporting wheel 200 keeps contact with the ground so that it prevent the motorcycle from being fell down when the motorcycle is inclined over predetermined degree to right or left.

In the meantime, the supporting wheels 200 keep the driver from being wounded when the motorcycle slide and fall down because the supporting wheels 200 become in touch with the ground quickly.

Furthermore, the driver can easily make the motorcycle stand when it falls down by manipulating the control unit 400 of falling direction so that the push-pull unit 300 pushes the supporting assembly 100 and the supporting wheels 200 at the same time, and then the supporting wheels 200 push the motorcycle body 20 while it keep contact with the ground.

Furthermore, one can easily ride on the rear saddle of the motorcycle when the push-pull unit 300 pushes the second part 120 and the third part 130 of the supporting assembly 100 so that the supporting wheel 200 keeps contact with the ground because he can step on the supporting assembly 100.

The invention claimed is:

1. A safety device for a motorcycle, comprising:
   a supporting assembly installed onto lateral sides of a body of a motorcycle and having a plurality of parts that are rotatable relative to each other;
   a supporting wheel installed onto the supporting assembly and rotatable relative to the supporting assembly;
   a push-pull unit connecting the supporting assembly to the body, adapted to push the supporting assembly so that the supporting wheel contacts a ground, and adapted to pull the supporting assembly so that the supporting wheel takes off the ground; and
   a control unit for controlling the push-pull unit,
   wherein the control unit includes: a pressure tank disposed in the body, a plurality of pipes that link the push-pull unit to the pressure tank, a valve unit connected to the pipes and adapted to control a flow direction of compressed air filled in the pressure tank, and a manipulation unit for controlling the valve unit,
   and wherein the manipulation unit includes: a slope detection unit for detecting a slope of the body when the body is inclined over a predetermined angle.

2. A safety device for a motorcycle as recited in claim 1, wherein the supporting assembly includes: a first part installed onto the body detachably; a second part connected to the first part rotatably; and a third part connected to the second part rotatably, connected to the push-pull unit and connected to the supporting wheel.

3. A safety device for a motorcycle as recited in claim 2, wherein a stopper is disposed on the first part to restrict a rotational angle of the second part.

4. A safety device for a motorcycle as recited in claim 2, wherein the second part is rotatable relative to the first part, an end of the first part is connected to one end of the second part by a first connection pin, the third part is rotatable relative to the second part, an other end of the second part is connected to an end of the third part by a second connection pin, and an angle between the first connection pin and the second connection pin is 90 degrees or less.

5. A safety device for a motorcycle as recited in claim 1, wherein the push-pull unit comprises: a connection part connected to the supporting assembly rotatably; an air cylinder having one end connected to the body rotatably and an other end that corresponds to an end of a rod and is connected to the connection part rotatably; and a spring having one end inserted into the rod and an other end supporting a surface of the connection part.

6. A safety device for a motorcycle as recited in claim 1, wherein the manipulation unit comprises: a changeover switch connected to the valve unit and adapted to toggle between an auto mode and a manual mode;

a manual switch connected to the changeover switch;

an auto switch adapted to be enabled or disabled according to a speed of the body; and a speed sensor connected to the auto switch and adapted to detect a speed of the body.

7. A safety device for a motorcycle as recited in claim 1, further comprising:

a pressure control unit for controlling a pressure change in the pressure tank due to a movement of the push-pull unit.

* * * * *